Sept. 20, 1960 G. MORA 2,952,902
MANUFACTURE OF TURBINE ROTORS
Filed Feb. 20, 1958 4 Sheets-Sheet 1

Sept. 20, 1960 G. MORA 2,952,902
MANUFACTURE OF TURBINE ROTORS
Filed Feb. 20, 1958 4 Sheets-Sheet 2

Inventor
Grata Mora
By
Watson, Cole, Grindle & Watson
Attorneys

Sept. 20, 1960 G. MORA 2,952,902
MANUFACTURE OF TURBINE ROTORS
Filed Feb. 20, 1958 4 Sheets-Sheet 3
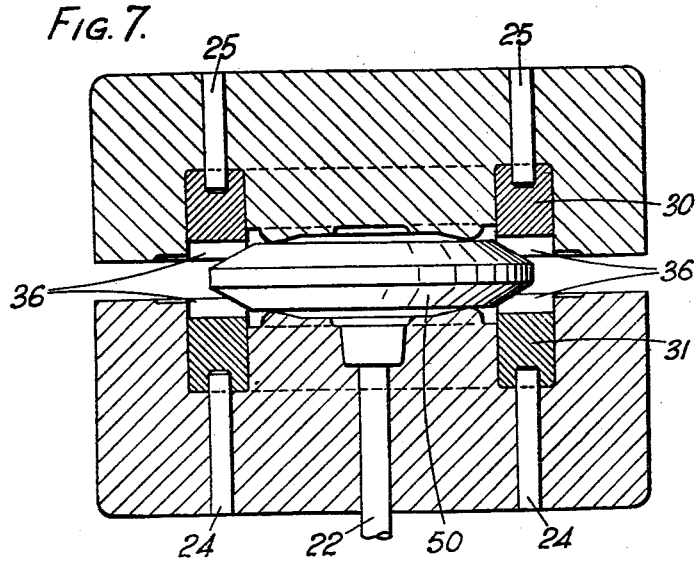
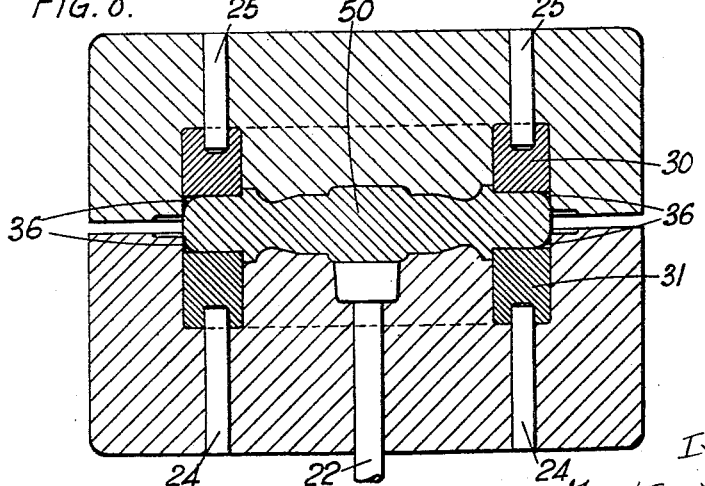

Sept. 20, 1960          G. MORA          2,952,902

MANUFACTURE OF TURBINE ROTORS

Filed Feb. 20, 1958          4 Sheets-Sheet 4

INVENTOR
Grato Mora
By Watson, Cole, Grindle & Watson
ATTORNEYS

United States Patent Office 2,952,902
Patented Sept. 20, 1960

2,952,902

MANUFACTURE OF TURBINE ROTORS

Grato Mora, Barnes, London, England, assignor to Omes Limited, London, England, a British company Filed Feb. 20, 1958, Ser. No. 716,502

Claims priority, application Great Britain May 2, 1951

3 Claims. (Cl. 29—156.8)

This invention comprises improvements in or relating to the manufacture of turbine rotors. The present application is a continuation in part of my application, Serial No. 285,189, filed April 30, 1952, now abandoned. In the production of bladed rotors for gas turbines it is necessary to employ alloys which are strong when hot and such materials are difficult to work, whether by forging or machining. In the smaller sizes especially, it is desirable that the blades and body of the rotor should be integral with one another. Hitherto forging has appeared impracticable in such cases and manufacture has necessitated machining from the solid, which is a very prolonged and difficult operation.

According to the present invention an integral rotor and blades are produced by forging in a die press a blank which is initially smaller in diameter than the finished rotor, between dies which are such as to squeeze the blank axially and in so doing force the metal of the periphery radially outward into portions of the die which form the blades. By this means it is found that the work on the dies is eased and the grain of the metal given an excellent flow-pattern which makes a good forging for resisting centrifugal stresses.

One difficulty which exists in attempting to forge bladed turbine rotors arises from the necessarily inclined attitude of the blades. When individual blades are forged the position of the forming surfaces in the dies can be arranged so that the forging pressure on the blank is balanced and there is no lateral pressure on the die. But in attempting to forge a bladed rotor, all the blades are inclined in one direction and produce a strong twisting effort on the die; it is one object of the present invention to provide a process in which this twisting effort is reduced and counteracted. It is a further object of the invention to improve the flow pattern of the metal and to improve the forging from the point of view of resisting centrifugal stresses.

The manner in which these and other objects are obtained will be clear from the following description, given by way of example of one form of die in accordance with the invention and of the process of production of an integral rotor for a gas turbine, using the die:

In the drawings:

Figure 6 is a diagram of a preforming operation on the billet, and

Figures 7 and 8 are diagrams showing successive stages of the forging operation.

Figs. 9 to 12 respectively represent a series of diagrammatic side elevational views of the upper and lower dies, in consecutive positions of operation, showing their action in forging a billet of material.

Figure 1:
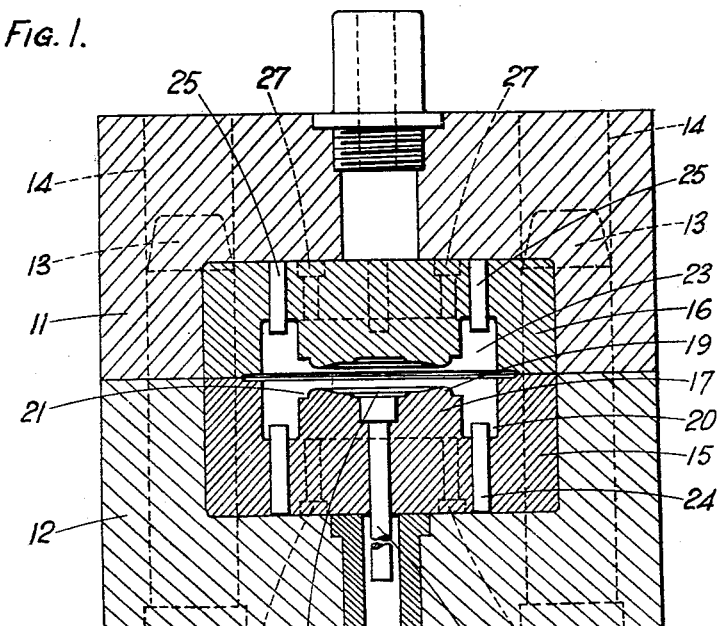
Figure 1 is a section of a pair of dies for use in accordance with the present invention.
Figure 2:
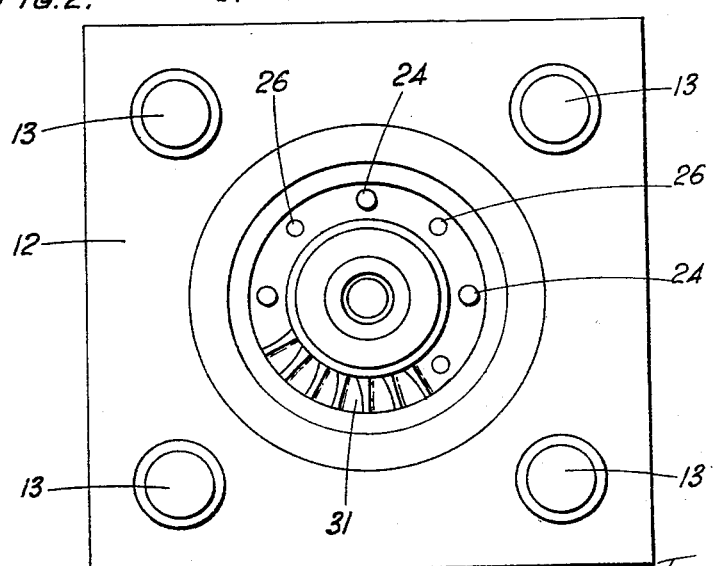
Figure 2 is a plan view of the lower die.

Referring to Figures 1 and 2, the die shown consists of two parts, an upper part 11 and a lower part 12 which are adapted to be mounted respectively on the ram and on the base of a fly-press or other suitable press.

The lower die 12 carries four upstanding locating pins 13 which enter corresponding holes 14 in the upper die 11 and ensure that the parts are in register when the blow is struck. Each die is hollowed out to contain a hardened liner or insert 15 in the case of the lower die and 16 in the case of the upper die, these inserts constituting the die proper. The lower insert 15 comprises a central portion 17 having a depression 18 corresponding to the hub of the desired turbine rotor. This is surrounded by a raised portion 19 corresponding in shape to the web of the rotor, and around the portion 19 is a deep recess 20. As the web of the rotor is to be tapered thickest near the hub and thinner near the flange, the raised portion 19 is sloped upwardly as it extends radially outwards and it is recessed at 21 to form a flange on the forging within the turbine blades.

In the centre of the die there is an ejector 22. The recess 20 is to contain an insert for the shaping of the blades. The upper die proper 16 is similar in shape to the lower die and includes a recess 23 corresponding to the recess 20, but the upper die is not provided with an ejector. Four locating pins 24 project in the recess 20 of the lower die and similar locating pins 25 project in the recess 23 of the upper die. Between the locating pins in each die are fixing screws 26, 27 for the inserts.

Figure 3:
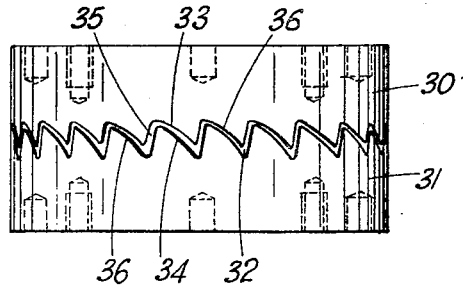
Figure 3 is a detail of part of two die-rings in side elevation showing the manner in which they mutually engage one another.
Figure 4:
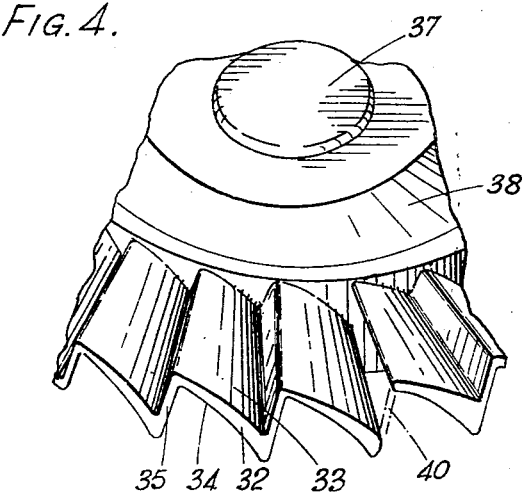
Figure 4 is a perspective view of a part of a completed forging.

The recesses 20, 23 in the lower and upper dies are, of course, annular and they are intended to receive ring-shaped inserts 30, 31 which are shown separately in side elevation in Figure 3 of the drawing and which are shaped so that when the upper and lower dies are together there is a zig-zag space 32 between them which includes the upper and lower faces of the desired blades of the rotor, numbered 33, 34 in the drawing, united together by slightly inclined webs 35. The teeth 36 of the lower die form with their surfaces 34 the hollow working faces of the rotor forging blades, and the teeth 36 of the upper die-ring 30 have hollow backs which form the convex faces of the rotor blades. These teeth are carefully shaped to afford a proper helical blade form. The intervening web portions 35 of the blades are made as steep as possible without undercutting. Figure 4 shows a broken away view of a part of a completed rotor having a hub portion 37, a web portion 38 and teeth 32 united by steep-sided webs 35. As can readily be seen in the drawing the backs of the teeth 33 and hollow underfaces 34 correspond to the spaces between the upper and lower die-rings 30, 31. In Figure 4 of the drawing one of the webs 35 is shown as cut away between the adjacent teeth as indicated by the chain line 40, and it will be seen that by machining away the web at 40 the teeth are separated from one another and the shape of the rotor is completed, the only remaining operation required being to smooth the surfaces of the backs and the hollows of the rotor teeth.

The die-rings 30, 31 are located in the recesses in which they rest by means of the locating pins 24, 25 and are held firmly in place by the screws 27 already referred to. Part of one of the die-rings is seen in place in Figure 2 of the drawing.

The forging of gas turbine parts, particularly blades, must be carried out on metal of a character which retains its strength even at low red heats, such as the steel alloy known under the trade name of "Nimonic." Such alloys are necessarily difficult to forge as they have to be forged at a temperature considerably in excess of the red heat at which they are intended to work, but not so high as to nearly liquefy the metal; that is to say, the range of forging temperatures is narrow, lying in practice between about 1050 and 1150° C.

Figure 5:
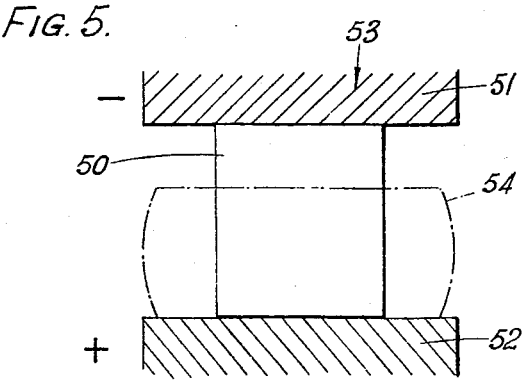
Figure 5 is a diagram of the billet heating operation.

In the process according to the present invention, a billet 50 (see Figure 5) of the metal, cut from rolled bar, is taken which contains sufficient metal to produce the forging and which is about one and half diameters in length. This is introduced between the electrodes 51, 52 of an electrical billet heater, and is brought by electrical heating to forging temperature. End pressure is applied in the direction of arrow 53, while the billet is still between the electrodes, and it is compressed until it reaches a diameter about equal to the diameter of the web-portion of the rotor to be forged, within the before described flange, as approximately indicated by chain-line 54. At this diameter the hot billet is still a good deal thicker in an axial direction than the thickness of the completed forging, and it will be observed that its diameter is less than the diameter of the forging at the roots of the blades.

Moreover, the billet is very hot and, in fact, is heated throughout its substance to the forging temperature. Electrical heating has the advantage for this purpose of bringing the billet very quickly to the forging temperature without requiring that it should soak for a long time in a furnace. Moreover, the compression which has been effected in the billet heater has already effected the commencement of grain-flow of a kind which is desirable in the finished forging. However, furnace heating can be used if desired. Preferably the billet is now pre-shaped in a preforming die to bring it nearer to the final shape, as shown in Figure 6 of the drawing. It is then reheated in a furnace.

The hot pre-formed billet is now placed in the press centrally upon the lower die 15 as shown in Figure 7 and the ram of the press is brought down to strike a heavy blow. When the blow is struck, as the metal cannot squeeze inwardly to the centre, the outer part of the metal is squeezed radially outwards. Simultaneously, the teeth 36 of the die-rings 30, 31, which at the beginning of the blow have little metal between them approach one another and as they are approaching each other the hot metal is squeezed out radially between them as shown by comparison of Figures 7 and 8. As the blow proceeds there is a radial extrusion of the metal to form the rotor teeth which is accompanied by a simultaneous squeezing of the metal of the teeth between the teeth of the upper and lower die-rings. At the conclusion of the blow, if the formation of the forging is complete, the metal will have been forced radially outwards to the very tips of the teeth.

Figure 9:
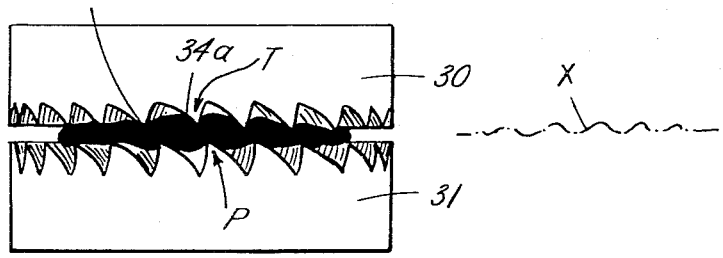

The squeezing of the metal between the teeth of the upper and lower die-rings, owing to the inclined helical shape of the surfaces 33, 34 of the finished blade would, if these were the only surfaces, produce a very strong twisting effort on the upper die relatively to the lower die which would tend to prevent the axial pressure from causing them to approach as closely as they should do and would bring extremely high frictional forces to bear on the pins 13 of the supporting structure, leading to unduly rapid wear of the parts and loss of accuracy in the forgings. The provision of the spaces which form the webs 35 between adjacent blades, however, leads to the introduction of further actions which are beneficial and not only obviate the twisting effort on the dies, but improve the grain structure of the metal. The web portions 35 between adjacent blades exert a twisting pressure on the dies in the opposite direction to that exerted by the inclined faces 33, 34 and prevent the undue wear which would otherwise occur. Moreover, in addition as the dies come together the web portions 35 are not only being extruded radially and compressed laterally, but they are being stretched in the up and down direction, that is to say, parallel to the axis of the rotor and this puts the stretching effort on the material which is being left in the blade portions 32, the stretching effort occurring in the direction transverse to the length of the blades. The combined actions of pressure, radial flow and lateral stretch on the blades during their formation lead to a very advantageous grain structure in the finished forging. In the accompanying diagram Figures 9 to 12 is shown the position of the upper and lower die portions 30, 31 at successive stages of the closure of the dies under the blow by which the forging is produced. Figure 9 corresponds to a position where the dies are closed a little more than in Figure 7 of the drawings accompanying the application, the teeth 36 having just begun to grip and deform the metal around the periphery of the blank, which latter is shown between the dies. The shape of the center line of the deformed periphery of the blank is indicated by chain line X at the right of the figure.

Figure 10:
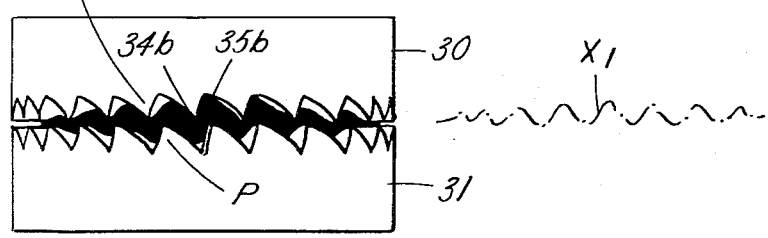

Figure 10 shows the dies closer together and the blank more deformed. As can be seen by comparison of Figures 7 and 8, the metal is spreading radially, but it can also be seen from Figure 10 that the tips T and P of the teeth 36 are biting into the blank and causing it to take a more serrated shape as indicated at the right of the figure by chain line $X_1$. It will be self-evident that chain-line $X_1$ is longer than X; that is to say, the metal is being stretched circumferentially.

Figure 11:
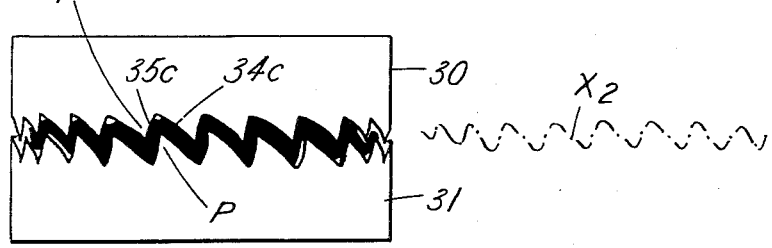

Figure 11 shows the dies closer still; the metal of the forging is further out radially, and also more serrated and the line $X_2$ indicates still greater circumferential stretch.

Figure 12:
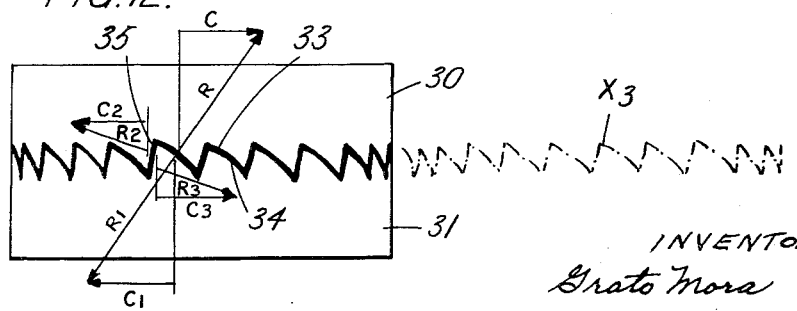

Figure 12 corresponds to Figure 3 of the drawing and to maximum circumferential stretch shown by line $X_3$.

It will further be manifest that the pressure on the sloping faces 33, 34 of the dies produces a reaction in the directions $R.R_1$ (Figure 12) which has tangential components $C.C_1$, while the pressure on the sloping faces of the webs 35 produces a reaction along lines $R_2.R_3$ having tangential components $C_2.C_3$ which balance $C.C_1$, whereas, if the webs 35 were omitted, there would be a net twisting effect on the dies. The provision of these purely temporary webs 35 is therefore beneficial in reducing stress on the dies and increasing their life.

After the forging blow has been struck, if it has been sufficiently heavy, formation will be complete, but if formation is not entirely complete it may be necessary to re-heat and strike an additional blow or blows. If a blow is struck after the proper forging temperature of the metal has been lost the result will be to damage the micro structure of the metal and render the forging useless. What is to be aimed at, is that one blow should be sufficient, and if not sufficient the forging must be re-heated and brought to a higher temperature before insertion in the die.

The result of the operations in the die is to cause a grain-flow in the metal such that the grain extends radially outwards parallel to the blade surfaces in the bodies of the teeth of the rotor, without any abrupt change in the direction of the grain at the junction with the main body of the rotor and with a certain amount of flow or stretch in a circumferential direction also, which is wholly beneficial.

It will be appreciated that the flange of the rotor is formed by the flow of the metal at the same time as the teeth, and the grain-flow curves round from the web of the rotor into the flange in a satisfactory manner.

The resultant forging, while almost accurate to size, is an intermediate product. The forging, after the appropriate normalising heat treatment, is completed by machining the blades. In this machining operation, which may conveniently be conducted by an end mill, or a plurality of end mills operating simultaneously, the principal metal to be removed consists of the bridges 35 which unite the tails of the blades to the forward edges of the adjacent blades, but a small amount of metal is machined away from over the whole of the surface of each blade. This machining is relatively easy compared with that which is required if the teeth are to be machined entirely from the solid as in past practice. It will be appreciated therefore that the completed machined component can be produced much more rapidly and economically than heretofore and also with a better grain structure. Moreover, the metal blank requires much less metal than if the whole of the blades is to be formed by machining from the solid, and the saving in metal alone is important in the case of expensive alloys such as are here in question.

It will be appreciated that instead of heating the billets in an electrical billet heater they could be heated in a furnace, if desired, and that reheating in a furnace, if necessary, can be adopted at any stage of the operations.

I claim:

1. A process of forging in heat resisting steel a turbine rotor complete with integral blades of aerofoil section and helical formation, comprising taking a billet having the requisite amount of metal for the complete rotor including blades but with a diameter initially smaller than the root diameter of the blades, heating said billet to a forging temperature at which the metal can be deformed smoothly without damage to the micro structure thereof, forging the billet at this temperature by giving it a single forging blow between dies which have inner parts shaped to form the portion of the rotor within the blade ring and outer parts coaxially surrounding the inner parts and of generally toothed helical configuration to shape the blades themselves into a helical shape, said dies squeezing the billet axially during the forging so as to force the metal of the billet radially outward to fill the spaces between the tooth-formed parts of the dies that shape the blades so that the forging on removal from the dies has a blade ring in zig-zag formation consisting of helical aerofoil formed blades joined by webs of excess metal, and thereafter machining away said webs to separate the blades from one another.

2. A process of forging in heat resisting steel a turbine rotor complete with integral blades of aerofoil section and helical formation, comprising taking a billet having the requisite amount of metal for the complete rotor including blades but with a diameter initially smaller than the root diameter of the blades, heating said billet to a forging temperature at which the metal can be deformed smoothly without damage to the micro structure thereof, forging the billet at this temperature by giving it a small number of single forging blows between dies and re-heating to said forging temperature between blows if more than one is required, which dies have inner parts shaped to form the portion of the rotor within the blade ring and outer parts coaxially surrounding the inner parts and of generally toothed configuration to shape the blades themselves, said dies squeezing the billet axially during the forging so as to force the metal of the billet radially outward to fill the spaces between the tooth-formed parts of the dies that shape the blades so that the forging on removal from the dies has a blade ring in zig-zag formation consisting of aerofoil helically formed blades joined by webs of excess metal, and thereafter machining away said webs to separate the blades from one another.

3. The process of forming a turbine rotor with integral radial blades of uniform helical pitch relative to the rotor axis from a disc of metal of a diameter smaller than the root diameter of the completed rotor, said process comprising the steps of axially compressing said disc between a pair of opposed dies to radially extrude and compress portions of said disc between blade forming portions of the dies to form an intermediate structure in which the leading edge of each blade is integrally connected by a generally axially disposed web of material to the trailing edge of an immediately adjacent blade, said webs during said compression opposing the relatively rotational forces imparted to the dies by the pitch of said blades and also stretching the metal transversely of the blades, and subsequently machining away said webs to separate the blades from one another.

References Cited in the file of this patent

UNITED STATES PATENTS

| 1,345,045 | Waters | June 29, 1920 |
| 1,454,508 | Eckert | May 8, 1923 |
| 1,486,365 | Cummings | Mar. 11, 1924 |
| 2,393,628 | Goldie et al. | Jan. 29, 1946 |

FOREIGN PATENTS

| 374,300 | Great Britain | June 9, 1932 |